US008465139B2

(12) United States Patent
Price et al.

(10) Patent No.: US 8,465,139 B2
(45) Date of Patent: Jun. 18, 2013

(54) THERMAL DEGASSING DEVICE FOR INKJET PRINTER

(75) Inventors: Brian G. Price, Pittsford, NY (US); Gary A. Kneezel, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 310 days.

(21) Appl. No.: 12/897,902

(22) Filed: Oct. 5, 2010

(65) Prior Publication Data

US 2012/0081483 A1 Apr. 5, 2012

(51) Int. Cl.

| | |
|---|---|
| ***B41J 2/19*** | (2006.01) |
| ***B01D 59/12*** | (2006.01) |
| ***B01D 19/00*** | (2006.01) |
| *F04B 19/24* | (2006.01) |

(52) U.S. Cl.
USPC ............. 347/92; 95/46; 96/6; 96/201; 417/52

(58) Field of Classification Search
USPC ...................... 347/92; 95/46; 96/201; 417/52
See application file for complete search history.

(56) References Cited

U.S. PATENT DOCUMENTS

| | | | | | |
|---|---|---|---|---|---|
| 4,301,459 | A * | 11/1981 | Isayama et al. | ................. | 347/92 |
| 4,340,895 | A | 7/1982 | Kikuchi | | |
| 5,183,486 | A * | 2/1993 | Gatten et al. | ........................ | 96/6 |
| 5,205,844 | A * | 4/1993 | Morikawa | ........................... | 96/6 |
| 5,341,162 | A | 8/1994 | Hermanson et al. | | |
| 5,375,979 | A * | 12/1994 | Trah | ................................ | 417/52 |
| 7,350,902 | B2 | 4/2008 | Dietl et al. | | |
| 2002/0097307 | A1* | 7/2002 | Tsukuda | ......................... | 347/92 |
| 2006/0078434 | A1* | 4/2006 | Kim et al. | ....................... | 417/51 |
| 2006/0284948 | A1* | 12/2006 | Ikeda et al. | ...................... | 347/92 |
| 2008/0151026 | A1* | 6/2008 | Kobayashi | ...................... | 347/92 |

FOREIGN PATENT DOCUMENTS

JP 2006095878 A * 4/2006

* cited by examiner

*Primary Examiner* — Shelby Fidler
(74) *Attorney, Agent, or Firm* — Eugene I. Shkurko; Amit Singhal

(57) ABSTRACT

An inkjet printhead having a drop ejector array, an ink passageway for providing ink to the drop ejector array, and a thermally actuated degassing unit. The degassing unit itself includes a body enclosing an air chamber, a check valve configured to allow air to vent from the air chamber to ambient when the pressure in the air chamber exceeds ambient air pressure by a predetermined amount. The thermal degassing unit includes a thermally-induced pressure build-up time to increase the pressure in the air chamber. The air chamber is allowed to cool which causes internal pressure to drop below ambient and draws gas out of the ink.

25 Claims, 16 Drawing Sheets

SECTION A-A

SECTION B-B

SECTION C-C

SECTION D-D

THERMAL DEGASSING DEVICE FOR INKJET PRINTER

CROSS REFERENCE TO RELATED APPLICATION

Reference is made to commonly assigned, co-pending U.S. patent application Ser. No. 12/897,908 by Price et al. filed of even date herewith entitled "Method of Thermal Degassing in an Inkjet Printer", the disclosure of which is incorporated herein by reference in its entirety.

FIELD OF THE INVENTION

This invention relates generally to the field of inkjet printing, and in particular to a degassing device for removing air from ink in an inkjet printer.

BACKGROUND OF THE INVENTION

An inkjet printing system typically includes one or more printheads and their corresponding ink supplies. A printhead includes an ink inlet that is connected to its ink supply and an array of drop ejectors, each ejector including an ink pressurization chamber, an ejecting actuator and a nozzle through which droplets of ink are ejected. The ejecting actuator may be one of various types, including a heater that vaporizes some of the ink in the chamber in order to propel a droplet out of the nozzle, or a piezoelectric device that changes the wall geometry of the ink pressurization chamber in order to generate a pressure wave that ejects a droplet. The droplets are typically directed toward paper or other print medium (sometimes generically referred to as recording medium or paper herein) in order to produce an image according to image data that is converted into electronic firing pulses for the drop ejectors as the print medium is moved relative to the printhead.

Motion of the print medium relative to the printhead can consist of keeping the printhead stationary and advancing the print medium past the printhead while the drops are ejected. This architecture is appropriate if the nozzle array on the printhead can address the entire region of interest across the width of the print medium. Such printheads are sometimes called pagewidth printheads. A second type of printer architecture is the carriage printer, where the printhead nozzle array is somewhat smaller than the extent of the region of interest for printing on the print medium and the printhead is mounted on a carriage. In a carriage printer, the print medium is advanced a given distance along a print medium advance direction and then stopped. While the print medium is stopped, the printhead carriage is moved in a carriage scan direction that is substantially perpendicular to the print medium advance direction as the drops are ejected from the nozzles. After the carriage has printed a swath of the image while traversing the print medium, the print medium is advanced, the carriage direction of motion is reversed, and the image is formed swath by swath.

Inkjet ink includes a variety of volatile and nonvolatile components including pigments or dyes, humectants, image durability enhancers, and carriers or solvents. A key consideration in ink formulation and ink delivery is the ability to produce high quality images on the print medium. Image quality can be degraded if air bubbles block the small ink passageways from the ink supply to the array of drop ejectors. Such air bubbles can cause ejected drops to be misdirected from their intended flight paths, or to have a smaller drop volume than intended, or to fail to eject. Air bubbles can arise from a variety of sources. Air that enters the ink supply through a non-airtight enclosure can be dissolved in the ink, and subsequently be exsolved (i.e. come out of solution) from the ink in the printhead at an elevated operating temperature, for example. Air can also be ingested through the printhead nozzles. For a printhead having replaceable ink supplies, such as ink tanks, air can also enter the printhead when an ink tank is changed.

In a conventional inkjet printer, a part of the printhead maintenance station is a cap that is connected to a suction pump, such as a peristaltic or tube pump. The cap surrounds the printhead nozzle face during periods of nonprinting in order to inhibit evaporation of the volatile components of the ink. Periodically, the suction pump is activated to remove ink and unwanted air bubbles from the nozzles. This pumping of ink through the nozzles is not a very efficient process and wastes a significant amount of ink over the life of the printer. Not only is ink wasted, but in addition, a waste pad must be provided in the printer to absorb the ink removed by suction. The waste ink and the waste pad are undesirable expenses. In addition, the waste pad takes up space in the printer, requiring a larger printer volume. Furthermore the waste ink and the waste pad must be subsequently disposed. Also, the suction operation can delay the printing operation Methods of degassing the ink in an inkjet printer that have previously been disclosed include a) reducing the pressure in an air space in contact with ink, b) heating the ink to cause air bubbles to come out of solution, or a combination of a) and b). U.S. Pat. No. 4,340,895 discloses heating the ink in an ink supply vessel of a recirculating ink supply and using a vacuum pump to provide a negative pressure on an air space above the liquid ink, thereby reducing the amount of gas dissolved in the ink. The ink can then be cooled before being used for printing. Disadvantages of this method include the additional space, cost and noise associated with a vacuum pump as well as the pump for the recirculating ink supply; the excessive energy required to heat the ink; and the need to either cool the ink or print with ink at elevated temperature.

U.S. Pat. No. 5,341,162 discloses heating ink to cause air bubbles to come out of solution in a secondary tank in a recirculating ink supply and enter an air space above the ink. The air then passes through a semi-permeable membrane, permitting air but not liquid to pass through a vent. Disadvantages include the need for a pump for the recirculating ink supply, as well as requiring excessive energy to heat the ink.

An air extraction device is described in commonly assigned US patent application (docket 95796). Such an air extraction device uses a compressible member (which can be compressed using motion of the carriage in a carriage printer, for example) to expel air through a one-way relief valve, thereby applying reduced air pressure at a membrane that is permeable to air but not to liquid. This causes air bubbles to come out of solution and pass through the membrane, with a portion of the accumulated air being expelled during the next compression of the compressible member. Such an air extraction device is satisfactory, and can be operated either with or without heating the ink. However, it requires time and carriage motion in order to compress the compressible member, and compression of the bellows can produce an audible sound.

What is needed is a degassing device for degassing ink in an inkjet printer that can remove air with little or no wastage of ink, that is compatible with a compact printer architecture, that is low cost, that is environmentally friendly, that is quiet, that does not heat the ink appreciably, and that does not delay the printing operation.

SUMMARY OF THE INVENTION

A preferred embodiment of the present invention comprises an inkjet printhead having a drop ejector array, an ink passageway for providing ink to the drop ejector array, and a thermally actuated degassing unit. The unit itself includes a body enclosing an air chamber, a check valve configured to allow air to vent from the air chamber to ambient when the pressure in the air chamber exceeds ambient air pressure by a predetermined amount, a heating element inside the air chamber, and a membrane including a first side and a second side, opposite the first side, wherein the first side faces the air chamber and the second side faces the ink passageway. There is also a holder for a detachable ink tank. The holder itself includes an ink port for receiving ink from the detachable ink tank and a surface including an opening connected to the ink passageway, wherein the membrane is adhered to the surface and wherein the membrane covers the opening. The surface can include a recess to accommodate the membrane. The ink passageway can include a second ink passageway and the membrane then covers both the first opening and the second opening. An ink manifold includes inlets disposed at a first spacing from each other for connecting to ink ports, and outlets disposed at a second spacing for connecting to a corresponding plurality of drop ejector arrays. The second spacing is less than the first spacing. A detachable ink tank is mounted in the holder, wherein the thermally actuated degassing unit is disposed between the drop ejector array and the ink tank. The membrane includes a characteristic time for a sufficient quantity of air to diffuse through the membrane to change the pressure in the air chamber by a predetermined amount. The thermal degassing unit includes a thermally-induced pressure build-up time to increase the pressure in the air chamber by the predetermined amount, wherein the characteristic time is greater than the thermally-induced pressure build-up time. The check valve includes a cracking pressure that is greater than 1.1 atmospheres. For a pressure change in the air chamber of 0.1 atmospheres, the characteristic time for air diffusion through the membrane is greater than five seconds and less than 500 seconds. For a pressure change in the air chamber of 0.1 atmospheres, the thermally-induced pressure build-up time is greater than 0.5 second and less than 100 seconds. The body that includes a heating element includes a first end and a second end, opposite the first end, where the heating element is disposed. The check valve is disposed proximate the second end. An alternative comprises an air chamber that includes a first portion at a first height, and a second portion at a second height that is greater than the first height, wherein the heating element and the check valve are proximate the second portion of the air chamber.

Another preferred embodiment of the present invention includes an inkjet printer comprising a drop ejector array, an ink passageway for providing ink to the drop ejector array, and a thermally actuated degassing unit. That unit includes a body enclosing an air chamber, a check valve configured to allow air to vent from the air chamber to ambient when the pressure in the air chamber exceeds ambient air pressure by a predetermined amount, a heating element inside the air chamber; and a membrane including a first side and a second side, opposite the first side, wherein the first side faces the air chamber and the second side faces the ink passageway and is in contact with the ink, and a controller for controlling operations of the inkjet printer. A printhead of the printer includes a drop ejector array, an ink passageway, and the thermally actuated degassing unit. A carriage moves the drop ejector array during printing of an image, and the thermally actuated degassing unit is configured to be moved by the carriage. It is preferable that the heating element does not touch the body of the air chamber, such as by suspending it within the chamber. The mass of the heating element is preferably less than about one gram.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

DETAILED DESCRIPTION OF THE INVENTION

Figure 1:
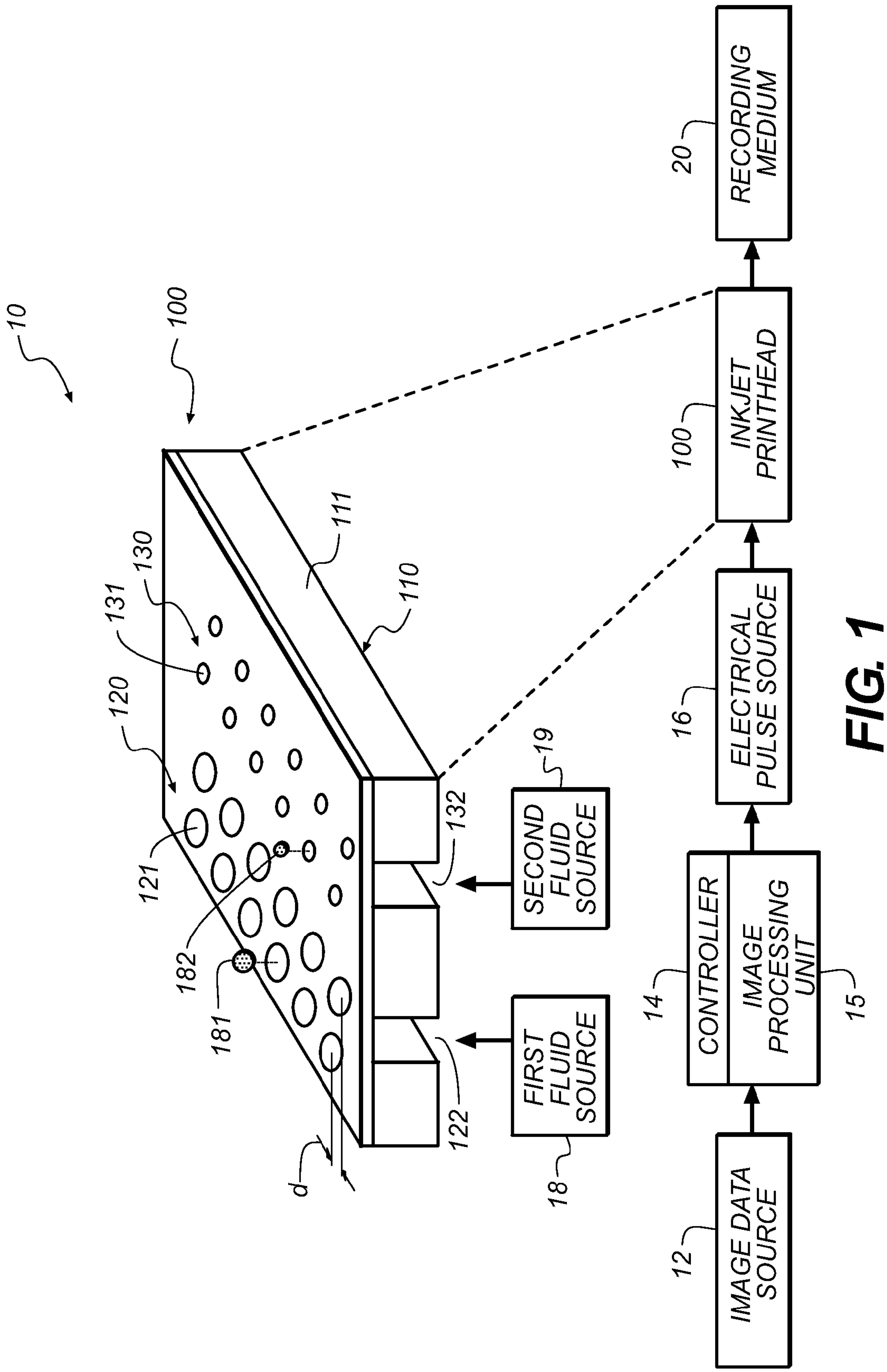
FIG. 1 is a schematic representation of an inkjet printer system.

Referring to FIG. 1, a schematic representation of an inkjet printer system 10 is shown, for its usefulness with the present invention and is fully described in U.S. Pat. No. 7,350,902, and is incorporated by reference herein in its entirety. Inkjet printer system 10 includes an image data source 12, which provides data signals that are interpreted by a controller 14 as being commands to eject drops. Controller 14 includes an image processing unit 15 for rendering images for printing, and outputs signals to an electrical pulse source 16 of electrical energy pulses that are inputted to an inkjet printhead 100, which inclu0des at least one inkjet printhead die 110.

In the example shown in FIG. 1, there are two nozzle arrays. Nozzles 121 in the first nozzle array 120 have a larger opening area than nozzles 131 in the second nozzle array 130. In this example, each of the two nozzle arrays has two staggered rows of nozzles, each row having a nozzle density of 600 per inch. The effective nozzle density then in each array is 1200 per inch (i.e. d=1/1200 inch in FIG. 1). If pixels on the recording medium 20 were sequentially numbered along the paper advance direction, the nozzles from one row of an array would print the odd numbered pixels, while the nozzles from the other row of the array would print the even numbered pixels.

In fluid communication with each nozzle array is a corresponding ink del0ivery pathway Ink delivery pathway 122 is in fluid communication with the first nozzle array 120, and ink delivery pathway 132 is in fluid communication with the second nozzle array 130. Portions of ink delivery pathways 122 and 132 are shown in FIG. 1 as openings through printhead die substrate 111. One or more inkjet printhead die 110 will be included in inkjet printhead 100, but for greater clarity only one inkjet printhead die 110 is shown in FIG. 1. In FIG. 1, first fluid source 18 supplies ink to first nozzle array 120 via ink delivery pathway 122, and second fluid source 19 supplies ink to second nozzle array 130 via ink delivery pathway 132. Although distinct fluid sources 18 and 19 are shown, in some applications it may be beneficial to have a single fluid source supplying ink to both 0the first nozzle array 120 and the second nozzle array 130 via ink delivery pathways 122 and 132 respectively. Also, in some embodiments, fewer than two or more than two nozzle arrays can be included on printhead die 110. In some embodiments, all nozzles on inkjet printhead die 110 can be the same size, rather than having multiple sized nozzles on inkjet printhead die 110.

Not shown in FIG. 1, are the drop forming mechanisms associated with the nozzles. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 16 are sent to the various drop ejectors 0according to the desired deposition pattern. (A drop ejector includes both the drop forming mechanism and the nozzle. Sometimes the terms “drop ejector array” and “nozzle array” are used interchangeably herein to mean the same thing, as the nozzle is the externally visible portion of the drop ejector.) In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on a recording medium 20.

Figure 2:
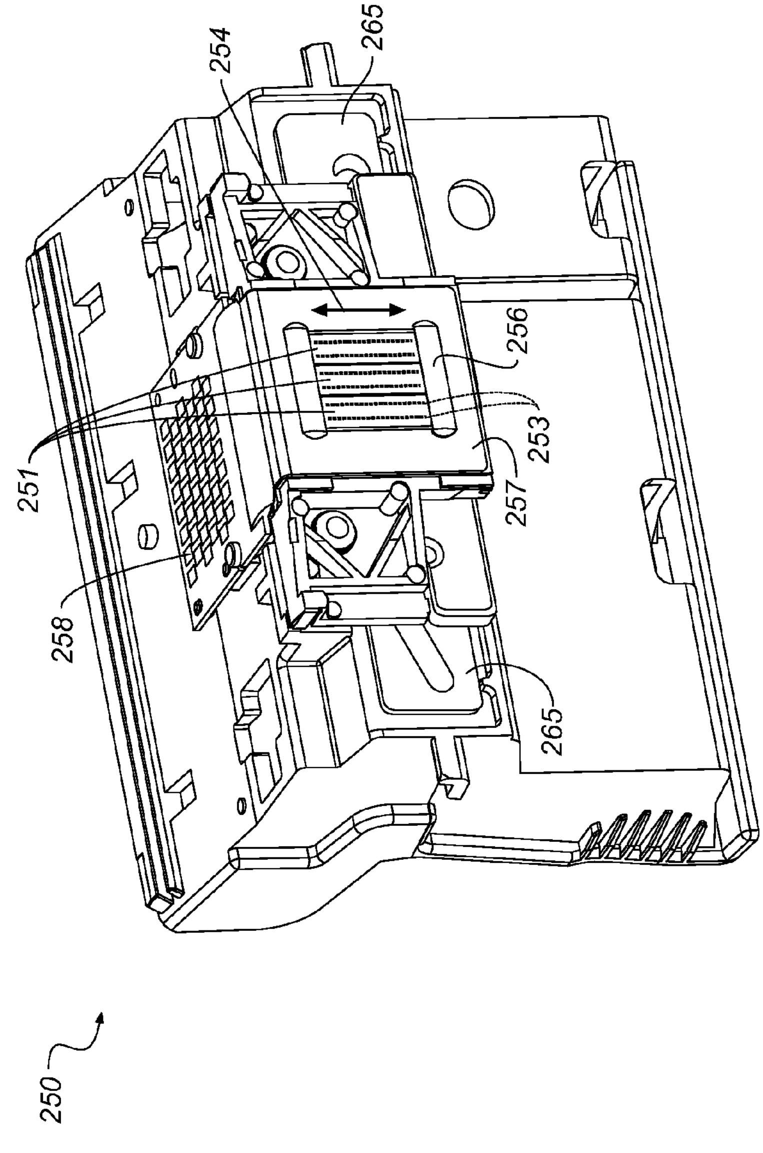
FIG. 2 is a perspective view of a printhead, as seen from the side including the printhead die.

FIG. 2 shows a perspective view of a portion of a printhead 250, which is an example of an inkjet printhead 100. Printhead 250 includes three printhead die 251 (similar to printhead die 110 in FIG. 1), each printhead die 251 containing two nozzle arrays 253, so that printhead 250 contains six nozzle arrays 253 altogether. The six nozzle arrays 253 in this example can each be connected to separate ink sources (see multi-chamber ink tank 262 and single chamber ink tank 264 in FIG. 3); such as cyan, magenta, yellow, text black, photo black, and a colorless protective printing fluid. In order to provide a supply of ink for several hundred pages, the ink tanks are typically significantly wider than the printhead die 251, so that in order to hold the ink tanks, printhead 250 is significantly wider than the region where the three printhead die 251 are located. A manifold 265 extends across the width of printhead 250 and provides ink passageways (described in more detail below relative to FIG. 6) between relatively widely spaced inlet ports 242 (see FIG. 5) and the relatively closely spaced outlets that bring ink to the six nozzle arrays 253 (e.g. through closely spaced ink delivery pathways 122 and 132 as shown in FIG. 1).

Each of the six nozzle arrays 253 is disposed along nozzle array direction 254, and the length of each nozzle array along the nozzle array direction 254 is typically on the order of 1 inch or less. Typical lengths of recording media are 6 inches for photographic prints (4 inches by 6 inches) or 11 inches for paper (8.5 by 11 inches). Thus, in order to print a full image, a number of swaths are successively printed while moving printhead 250 across the recording medium 20. Following the printing of a swath, the recording medium 20 is advanced along a media advance direction that is substantially parallel to nozzle array direction 254.

Also shown in FIG. 2 is a flex circuit 257 to which the printhead die 251 are electrically interconnected, for example, by wire bonding or TAB bonding. The interconnections are covered by an encapsulant 256 to protect them. Flex circuit 257 bends around the side of printhead 250 and connects to connector board 258. When printhead 250 is mounted into the carriage 200 (see FIG. 3), connector board 258 is electrically connected to a connector (not shown) on the carriage 200, so that electrical signals can be transmitted to the printhead die 251.

Figure 3:
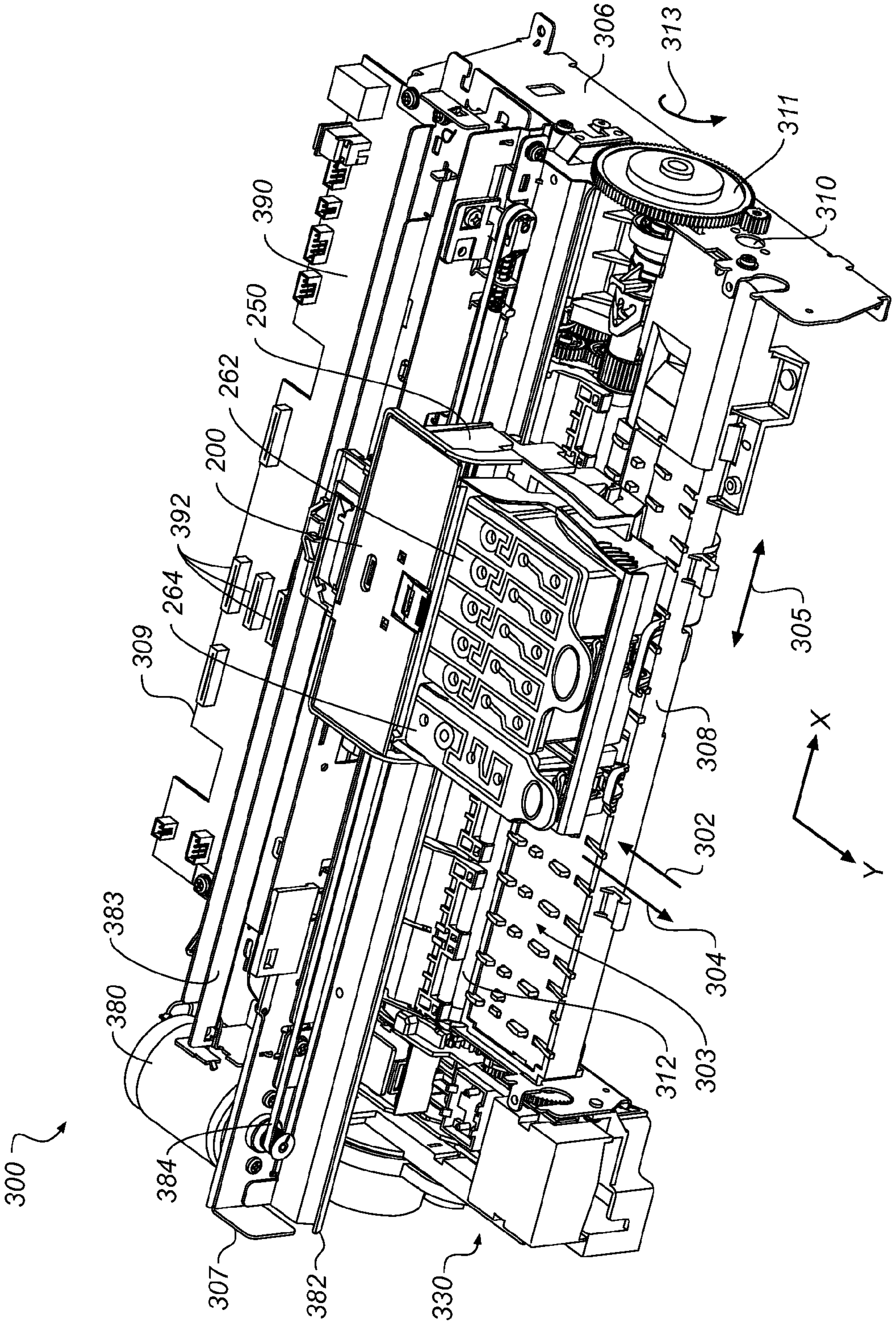
FIG. 3 is a perspective view of a portion of a carriage printer.

FIG. 3 shows a portion of a desktop carriage printer. Some of the parts of the printer have been hidden in the view shown in FIG. 3 so that other parts can be more clearly seen. Printer chassis 300 has a print region 303 across which carriage 200 is moved back and forth in carriage scan direction 305 along the X axis, between the right side 306 and the left side 307 of printer chassis 300, while drops are ejected from printhead die 251 (not shown in FIG. 3) on printhead 250 that is mounted on carriage 200. Carriage motor 380 moves belt 384 to move carriage 200 along carriage guide rail 382. An encoder sensor (not shown) is mounted on carriage 200 and indicates carriage location relative to an encoder fence 383.

Printhead 250 is mounted in carriage 200, and multi-chamber ink tank 262 and single-chamber ink tank 264 are installed in the printhead 250. The mounting orientation of printhead 250 is rotated relative to the view in FIG. 2, so that the printhead die 251 are located at the bottom side of printhead 250, the droplets of ink being ejected downward onto the recording medium in print region 303 in the view of FIG. 3. Multi-chamber ink tank 262, in this example, contains five ink sources: cyan, magenta, yellow, photo black and colorless protective fluid; while single-chamber ink tank 264 contains the ink source for text black. In other embodiments, rather than having a multi-chamber ink tank to hold several ink sources, all ink sources are held in individual single chamber ink tanks. Paper or other recording medium (sometimes generically referred to as paper or media herein) is loaded along paper load entry direction 302 toward the front of printer chassis 308.

Figure 4:
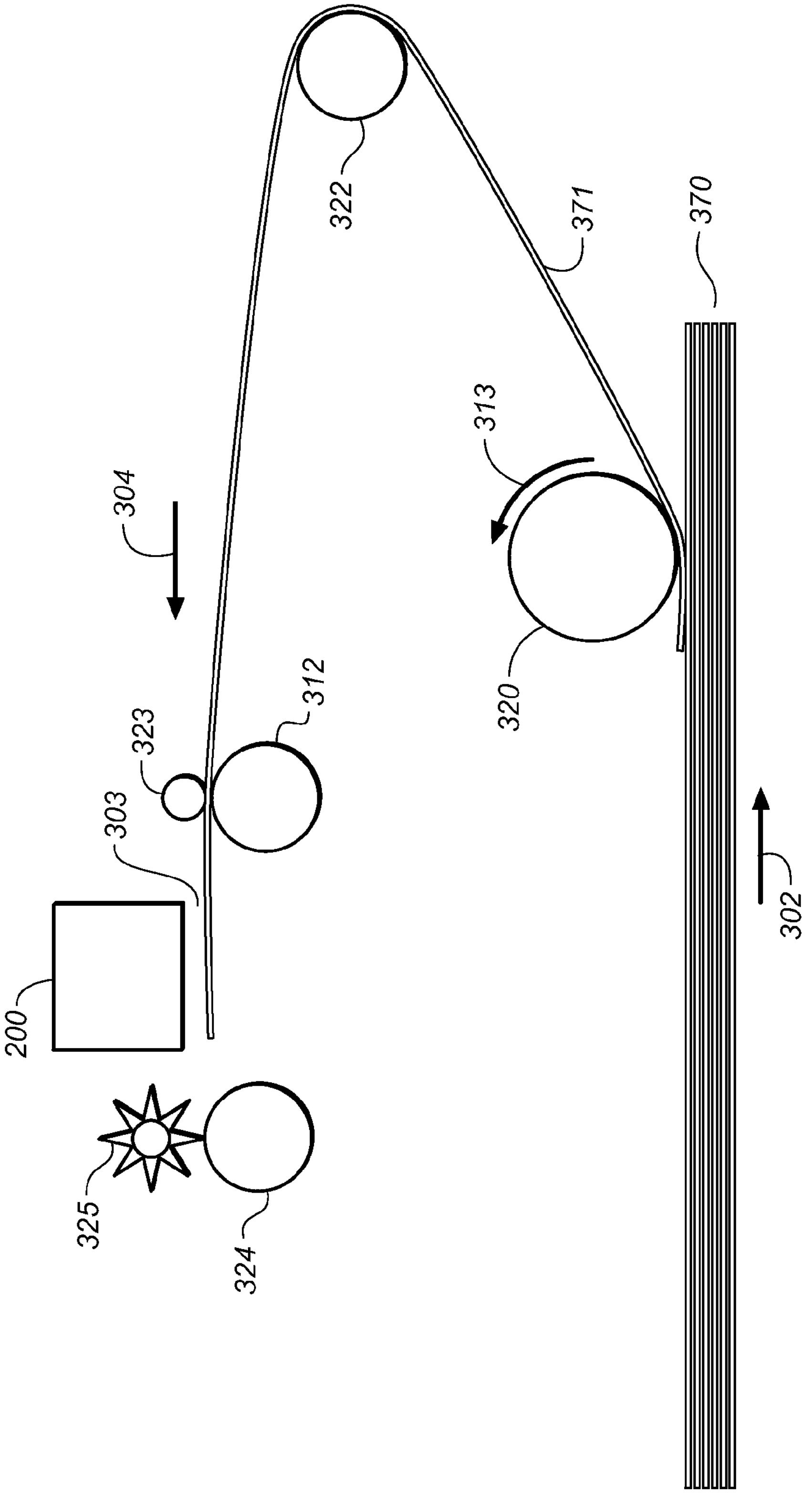
FIG. 4 is a schematic side view of an exemplary paper path in a carriage printer.

A variety of rollers are used to advance the medium through the printer as shown schematically in the side view of FIG. 4. In this example, a pick-up roller 320 moves the top piece or sheet 371 of a stack 370 of paper or other recording medium in the direction of arrow, paper load entry direction 302. A turn roller 322 acts to move the paper around a C-shaped path (in cooperation with a curved rear wall surface) so that the paper continues to advance along media advance direction 304 from the rear 309 of the printer chassis (with reference also to FIG. 3). The paper is then moved by feed roller 312 and idler roller(s) 323 to advance along the Y axis (shown in FIG. 3) across print region 303, and from there to a discharge roller 324 and star wheel(s) 325 so that printed paper exits along media advance direction 304. Feed roller 312 includes a feed roller shaft along its axis, and feed roller gear 311 is mounted on the feed roller shaft. Feed roller 312 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller.

The motor that powers the paper advance rollers is not shown in FIG. 3, but the hole 310 at the right side of the printer chassis 306 is where the motor gear (not shown) protrudes through in order to engage feed roller gear 311, as well as the gear for the discharge roller (not shown). For normal paper pick-up and feeding, it is desired that all rollers rotate in forward rotation direction 313. Toward the left side of the printer chassis 307, in the example of FIG. 3, is the maintenance station 330.

Toward the rear of the printer chassis 309, in this example, is located the electronics board 390, which includes cable connectors 392 for communicating via cables (not shown) to the printhead carriage 200 and from there to the printhead 250. Also on the electronics board are typically mounted one or more power supplies, motor controllers for the carriage motor 380 and for the paper advance motor, a processor and/or other control electronics (shown schematically as controller 14 and image processing unit 15 in FIG. 1) for controlling the printing process, and an optional connector for a cable to a host computer.

Figure 5:
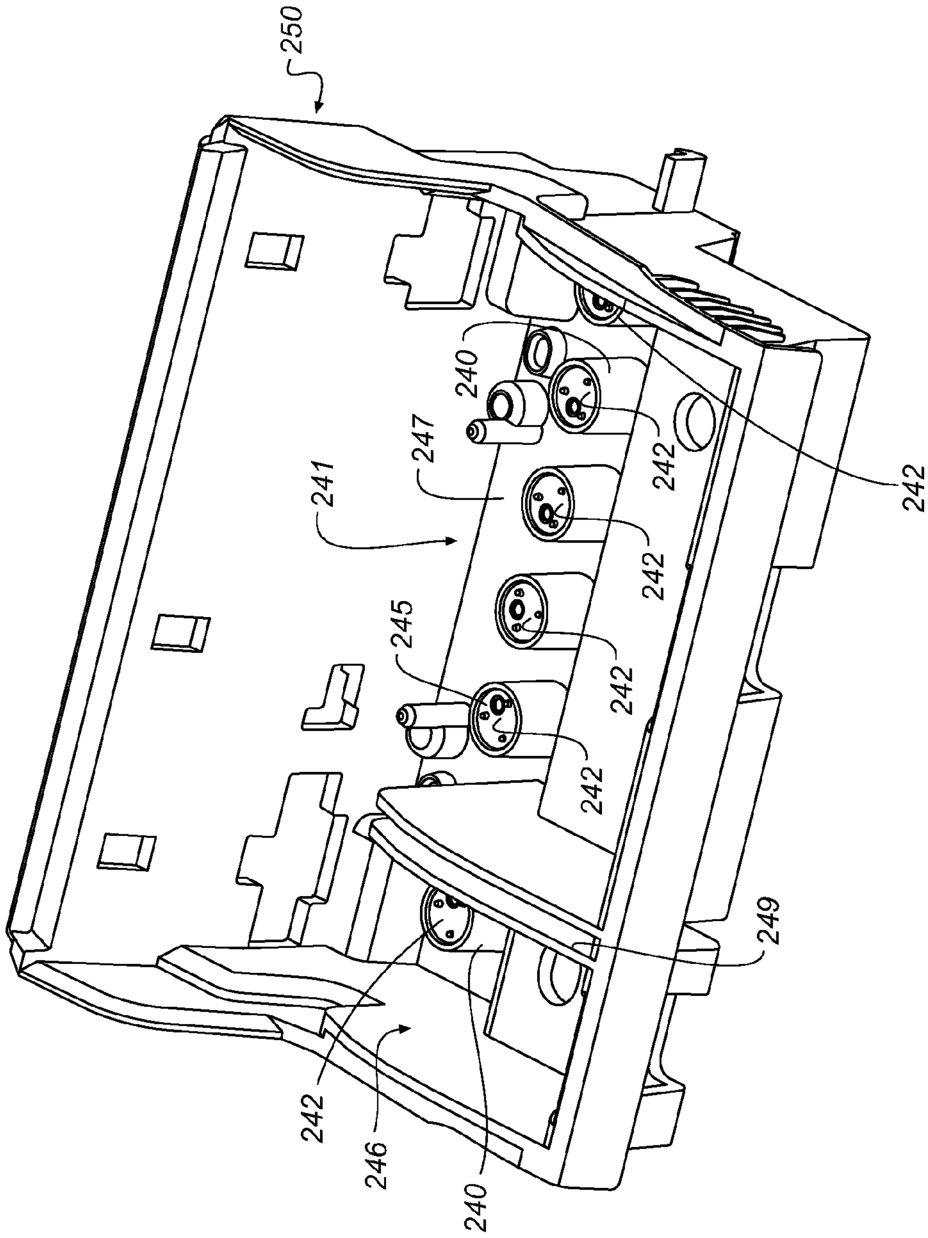
FIG. 5 is a perspective view of a printhead, as seen from the side including the ink tank holding regions.
Figure 6:
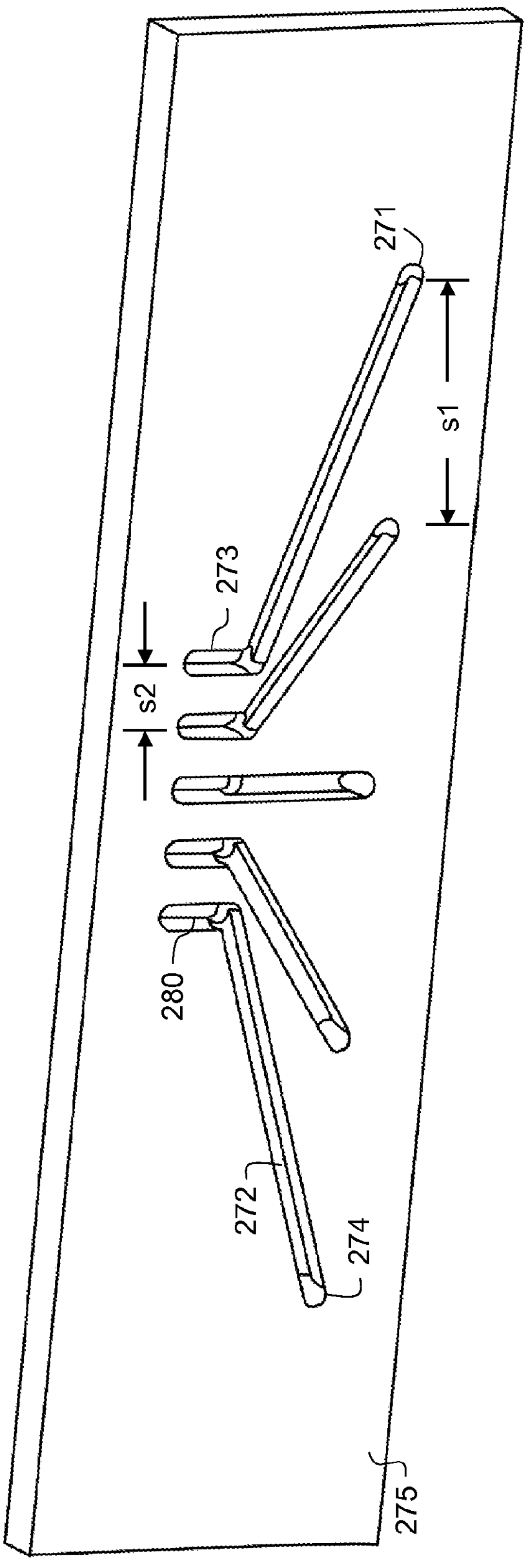
FIG. 6 is a perspective view of a portion of a printhead opposite the inlet port region.
Figures 7A, 7B, 7C:
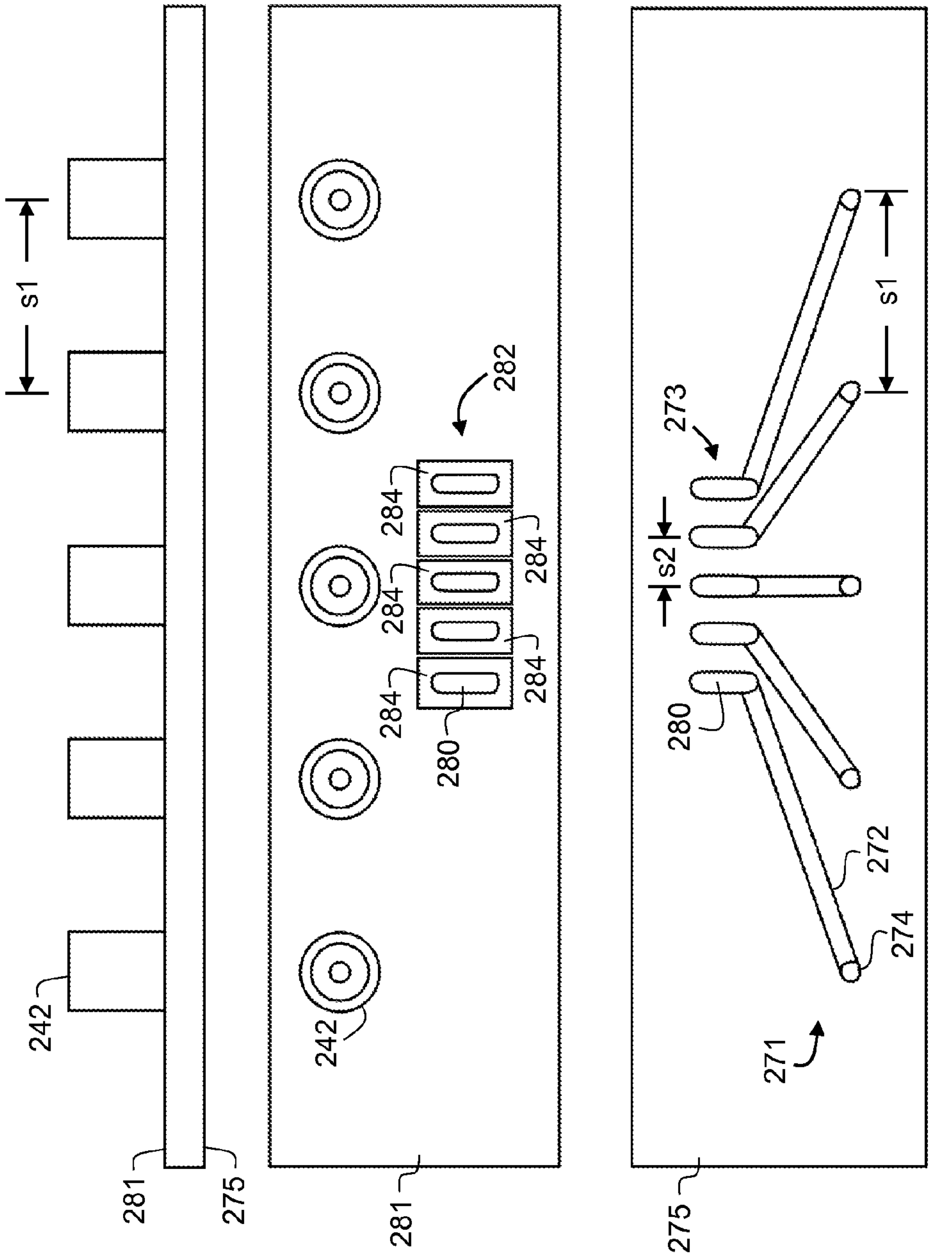
FIGS. 7A, B and C are a side view, an inlet port face view, and groove face view of a portion of a printhead.

FIG. 5 shows a perspective view of printhead 250 (rotated with respect to FIG. 2) without either replaceable ink tank 262 or 264 mounted onto it. Multi-chamber ink tank 262 (see FIG. 3) is detachably mountable in ink tank holder 241 and single chamber ink tank 264 is detachably mountable in ink tank holder 246 of printhead 250. Ink tank holder 241 is separated from ink tank holder 246 by a wall 249, which can also help guide the ink tanks during installation. Five inlet ports 242 are shown in holder 241 that connect with outlet ports (not shown) of multi-chamber ink tank 262 when it is installed onto printhead 250, and one inlet port 242 is shown in holder 246 for the outlet port (not shown) on the single chamber ink tank 264. In the example of FIG. 5 each inlet port 242 has the form of a standpipe 240 that extends from the floor of printhead 250. Typically a filter (such as woven or mesh wire filter, not shown) covers the end 245 of the standpipe 240. On the floor of printhead 250 (having a surface 281, a portion of which is shown in FIG. 7A) surrounding standpipes 240 of inlet ports 242 is an elastomeric gasket 247. When an ink tank is installed into the corresponding ink tank holder 241 or 246 of printhead 250, it is in fluid communication with the printhead because of the connection of outlet ports of the ink tank with the ends 245 of standpipes 240 of inlet ports 242.

Figure 8A:
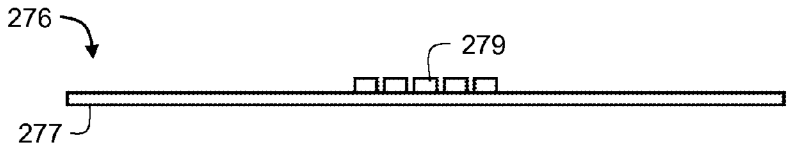
FIGS. 8A, B and C are a side view, an outlet pipe face view and a sealing face view of a cover.
Figure 8B:
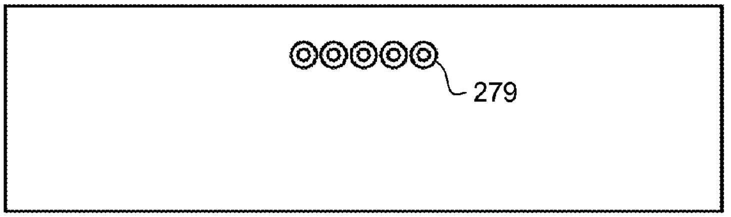
Figure 8C:
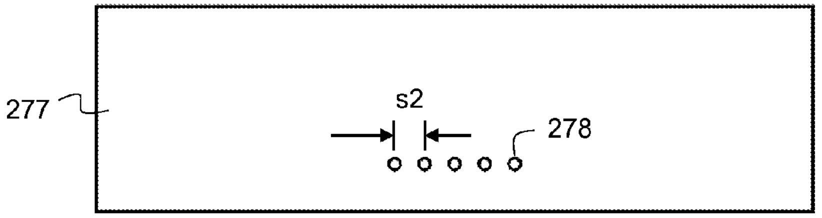

As described above relative to FIG. 2, manifold 265 provides ink passageways between the relatively wide spacings of inlet ports 242 (FIG. 5) and the close spacings of the outlets that provide ink to the nozzle arrays 253. FIGS. 6 and 7A-C show a portion of a printhead having five inlet ports 242 rather than the six inlet ports shown in FIG. 5. Five corresponding ink passageways 270 (two of which are shown schematically in FIG. 10) are formed by grooves 272 in printhead 250 on a surface 275 that is opposite ink ports 242. Holes 274, at first ends 271 of the grooves 272 connect inlet ports 242 with corresponding grooves 272. Inlet ports 242, which extend from surface 281, also called the floor relative to FIG. 5) and corresponding holes 274 are spaced at a relatively wide spacing s1 to connect with ink tanks. The second ends 273 of the grooves 272 are spaced at a closer spacing s2 (i.e. s2<s1). A sealing face 277 of cover 276, shown in FIGS. 8A-C, is affixed to surface 275 of printhead 250, isolating the grooves 272 and completing the ink passageways 270. Cover 276 includes outlet holes 278 that go through the cover 276 to outlet pipes 279 for providing ink at the required spacing to nozzle arrays 253. Outlet holes 278 and outlet pipes 279 are spaced at spacing s2, and outlet holes 278 are aligned with second ends 273 of ink passageways 270. FIG. 8A is a side view, FIG. 8B is an outlet pipe face view, and FIG. 8C is a sealing face view of cover 276.

Embodiments of the present invention include a thermally actuated degassing unit configured to remove air from one or more ink passageways in a printer. Examples described below have the thermally actuated degassing unit incorporated into carriage-mountable printhead 250 to remove ink from ink passageways 270. However, other embodiments are contemplated, such as a thermally actuated degassing unit mounted near a stationarily mounted off-axis ink supply that provides ink to the printhead. The printer can be a carriage printer, but the invention is also applicable to pagewidth printers.

Figure 9:
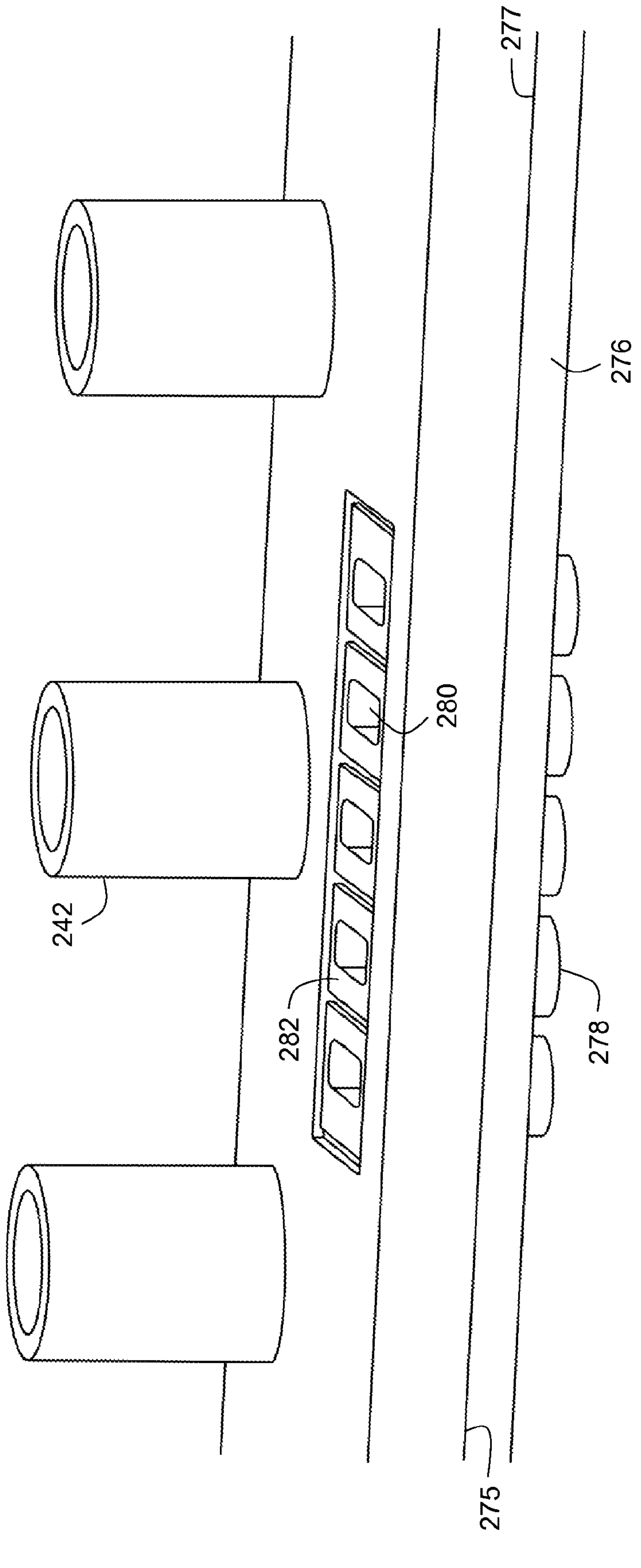
FIG. 9 is a perspective close-up view of a region of a printhead configured to receive a degassing unit according to an embodiment of the invention.
Figure 10:
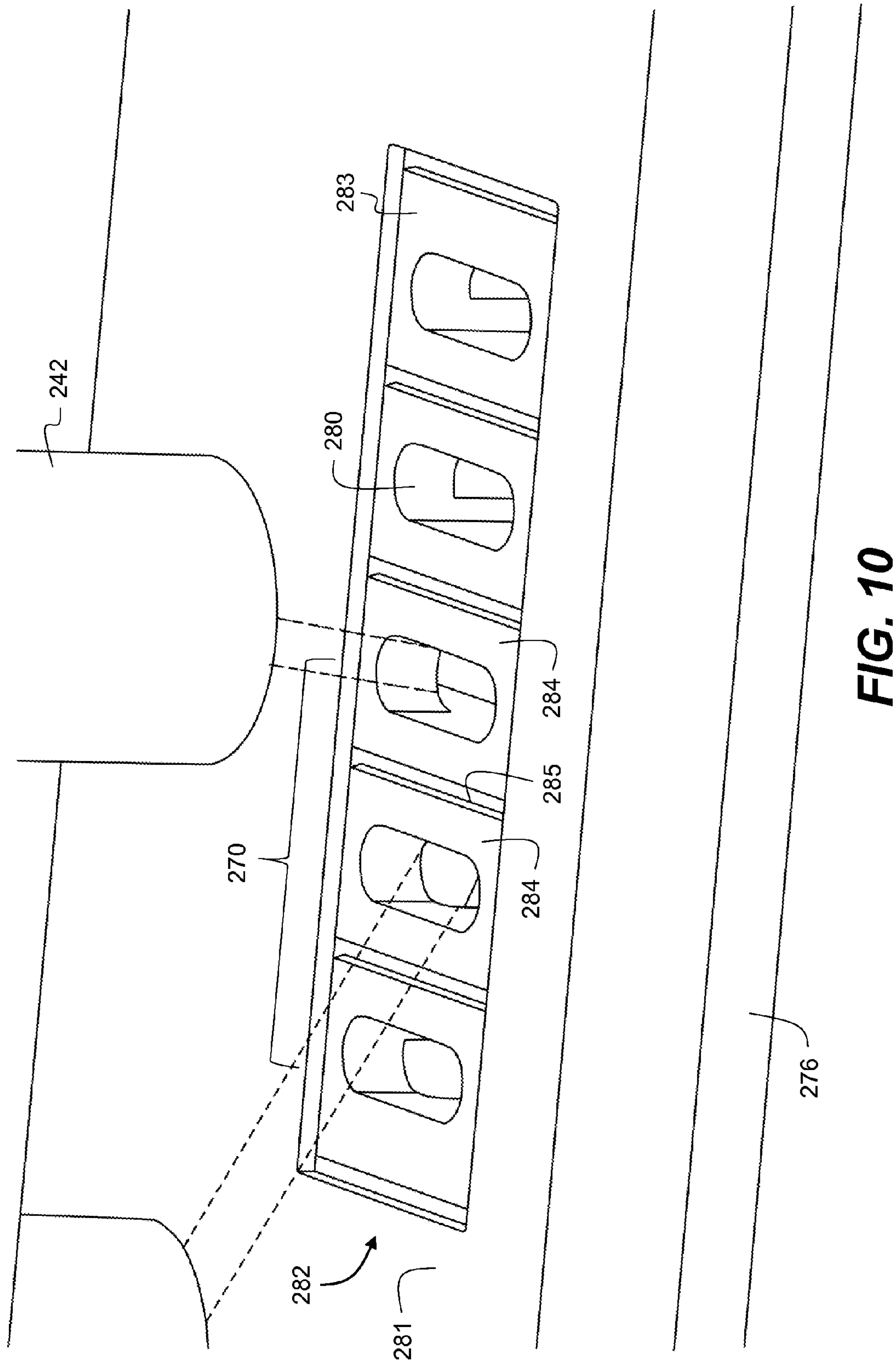
FIG. 10 is an even closer view of the region shown in FIG. 9.

In a first embodiment of the invention, openings 280 (see FIGS. 6 and 7A-C) are configured to extend through printhead 250 from surface 275 to surface 281 on the inlet port 242 side. The openings 280 are located at or near the second ends 273 of ink passageways 270. It is through openings 280 that air is drawn out of the ink passageways 270 by the thermally actuated degassing unit in this embodiment. Also shown in FIG. 7B is a recess 282 that is partitioned into five sections 284, such that each section 284 includes an opening 280. FIGS. 9 and 10 show close-up perspective views of the recess 282 after sealing surface 277 of cover 276 has been bonded to surface 275 of the printhead. Openings 280 are substantially aligned with outlets 278 in this example, but that is not a requirement. It is only required that openings 280 allow air to be drawn from ink passageways 270 (FIG. 10). FIG. 10 more clearly shows the partitioning of recess 282 into sections 284, each section including an opening 280. To isolate the sections 284 from one another, walls 285 are provided between the faces 283 of each section 284. Adhesive (not shown) can be used to bond a membrane 288 (FIG. 11) to the tops of walls 285. The tops of walls 285 are recessed approximately 100 microns in one example, relative to printhead surface 281 that is opposite printhead surface 275, in order to accommodate a membrane 288 that is about 100 microns thick. The face 283 of each section 284 can be further recessed approximately 100 microns from the top of wall 285.

Figure 11:
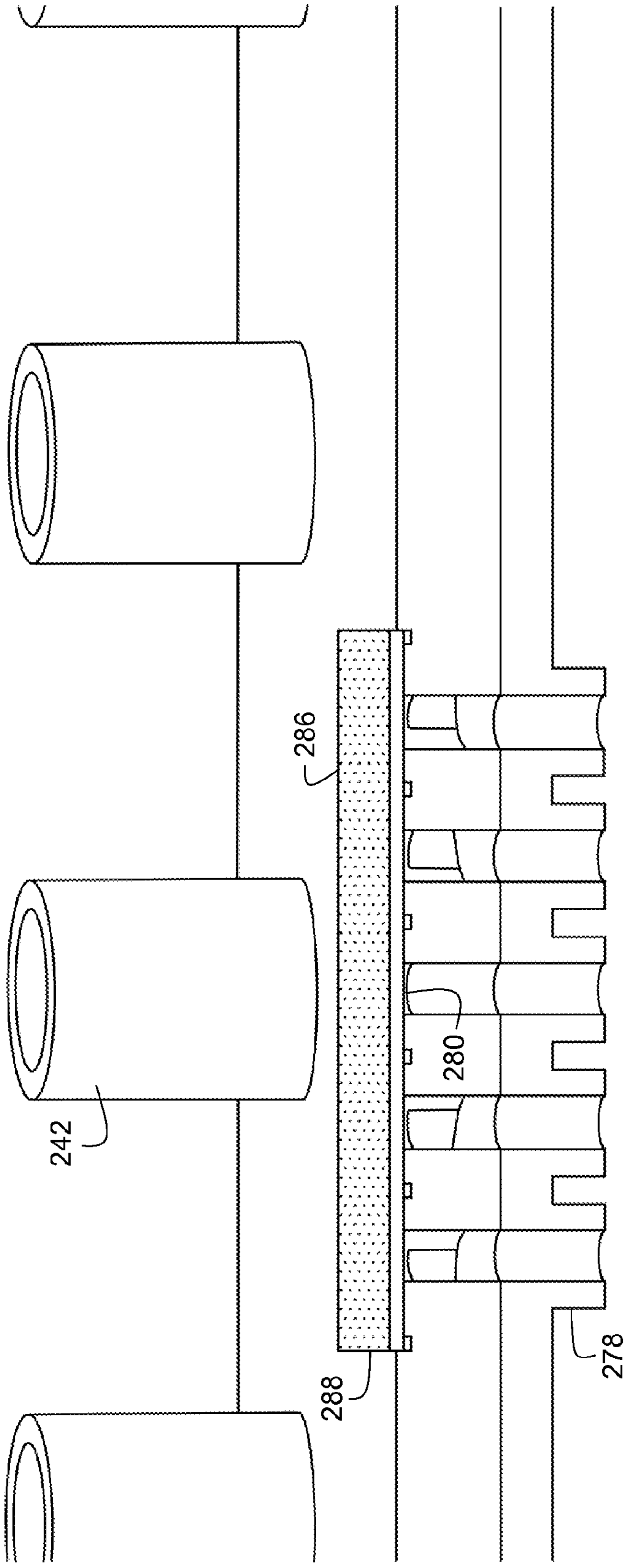
FIG. 11 is a cutaway perspective view of the region shown in FIG. 9, but with a permeable membrane attached.

FIG. 11 shows a perspective cutaway view after membrane 288 has been bonded to walls 285 at recess 282, thereby isolating openings 280. Membrane 288, which is part of the thermally actuated degassing unit of the invention, is permeable to air, but does not allow ink to pass through it. Membrane 288 can be a 100 micron thick sheet of polydimethylsiloxane (PDMS), for example, but in different embodiments can range in thickness from 25 microns to 300 microns. Membrane 288 includes a first side 286 that faces an air chamber 295 within a body 291 (FIG. 12) of the thermally actuated degassing unit, and a second side opposite first side 286 that faces openings 280 of the ink passageways 270 (see FIG. 10).

Figure 12:
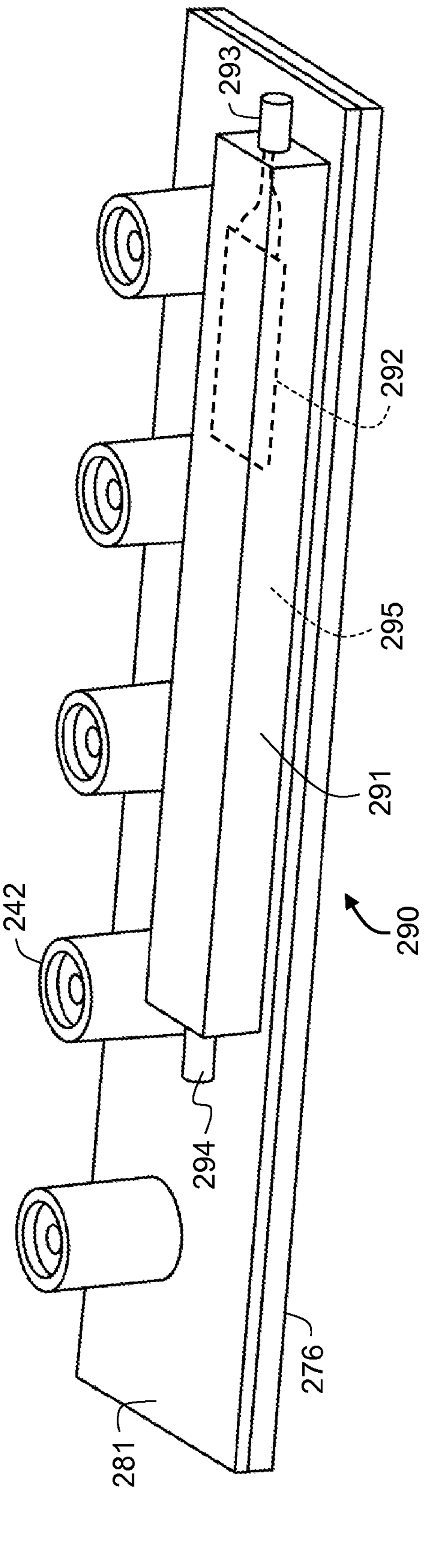
FIG. 12 shows the region seen in FIG. 11, but with a thermally actuated degassing unit attached, according to a first embodiment of the invention.

FIG. 12 shows a perspective view after body 291 of thermally actuated degassing unit 290 has been affixed to surface 281 of printhead 250. With reference to FIG. 5, gasket 247 has not yet been put into place on surface 281 surrounding ink ports 242. Gasket 247 would typically not extend between body 291 and surface 281. When a detachable ink tank (262 or 264) is mounted in the corresponding holder 241 or 246, the thermally actuated degassing unit 290 is disposed between the ink tank and the printhead die 251 with its drop ejector arrays (i.e. nozzle arrays 253). Also seen in FIG. 12 are electrical lead 293 and a check valve 294. With reference to FIG. 2, lead 293 can be connected to connector board 258. Check valve 294 is a one-way valve that allows air to pass from an air chamber 295 within body 291 to outside of the body 291 when the air pressure within body 291 exceeds the ambient air pressure outside of the body 291 by a predetermined amount. However, check valve 294 does not allow air to pass from outside of the body 291 into the air chamber 295 within. Check valve 294 can be a flapper valve, a duckbill valve, a ball and spring, or other type of valve that is configured to allow air to pass from the air chamber 295 to outside ambient, but not in the reverse direction. Typically the check valve relies on restoring forces (such as elastic restoring forces) to close the valve once the pressure inside air chamber 295 (relative to external pressure) is insufficient to keep the valve open.

Inside of the body 291 of thermally actuated degassing unit 290 is a pair of leads indicated by dashed lines and connected to heating element 292 within the air chamber 295 inside of the body 291. Membrane 288 is not shown in FIG. 12. Heating element 292 can be made of a high resistance material such as nichrome, for example, that will heat up to a greater extent than the lower resistance leads 293. Heating element 292 can be suspended within the air chamber 295, not touching body 291, such that heating element 292 does not lose much of its heat to the body 291. In the example of FIG. 12, the heating element 292 is shown toward one end of thermally actuated degassing unit 290 and check valve 294 is shown at the opposite end.

Thermally actuated degassing unit 290 removes air from ink passageways 270 in the following way. When electrical power is applied to heating element 292 from a power supply, such as electrical pulse source 16 shown in FIG. 1, heating element 292 heats up by joule heating. Heat from heating element 292 is transferred to the air within air chamber 295 inside body 291. According to the ideal gas law, pV=nRT, where p is pressure within the chamber, V is volume of air in the air chamber, n is the amount of air, R is the gas constant, and T is the absolute temperature of the air in the air chamber. When the temperature T rises, the pressure p rises proportionally within the air chamber. When p reaches the cracking pressure of check valve 294, the check valve 294 opens temporarily, allowing a quantity of air to pass from the air chamber within body 291 to outside body 291. If the initial amount of air in the air chamber 295 was $n_1$, and the amount of air in the air chamber after the check valve opened is $n_2$, then $n_2<n_1$. The check valve 294 closes when the resulting pressure within the air chamber $p_2=n_2RT_2N$ decreases sufficiently. Then if electrical power to heating element 292 is turned off, the temperature decreases to $T_3<T_2$, so that $p_3=n_2RT_3N$ is less than $p_2$. If $T_3$ is sufficiently less than $T_2$ (on the order of the initial temperature $T_1$), then since $n_2<n_1$, the air pressure in air chamber 295 within body 291 is less than it initially was. This decreased air pressure is effective in drawing air through membrane 288 and openings 280, so that air is removed from ink passageways 270. Air from the several ink passageways 270 accumulates in the air chamber 295 within body 291 until a subsequent time when electrical power is again applied to heating element 292, raising the temperature and pressure of the air in the air chamber 295 until air is again expelled through the check valve 294.

It has been found that a decrease in pressure of about 0.1 atmosphere in the air chamber 295 of thermally actuated degassing chamber 290 is sufficient to degas the ink in ink passageways 270 to a beneficial extent. Since ambient pressure is assumed to be approximately 1.0 atmosphere, this implies that the cracking pressure of check valve 294 is preferably greater than 1.1 atmospheres (increasing the pressure in the air chamber by at least 0.1 atmosphere before venting through the check valve 294), so that a sufficient quantity of air is expelled when the check valve is open, that when the temperature of heating element 292 is subsequently reduced by turning off the power, a pressure decrease in the air chamber of at least 0.1 atmosphere is achieved.

The temperature of the operating environment of a printer is typically around 20 to 30 degrees Centigrade, or approximately 300 degrees Kelvin. In order for the air in the air chamber 295 to cool down sufficiently for the pressure to decrease by at least 10% (0.1 atmosphere), the air in the air chamber thus needs to cool down by 30 degrees (Centigrade or Kelvin). Thus, it is preferable that the heating element 292 be heated by more than 30 degrees Centigrade when the electrical power is applied to it.

An advantage of the present invention over the references ('895 and '162) cited in the background section in which a heating element is in contact with ink, is that much less heat is required to heat air a given amount as compared to ink. Thus the present invention is more energy efficient. In addition, considering that proper operation of some inkjet printers (such as thermal inkjet printers) requires that the printhead and ink remain within a given temperature range, the present invention does not result in disadvantageously overheating the ink and printhead. In the present invention, membrane 288 can be in contact with ink in ink passageways 270, but heating element 292 is not in contact with ink. In some embodiments, even though the air in the air chamber of thermally actuated degassing unit increases in temperature by more than 30 degrees C., it is preferred that the temperature of ink in ink passageways 270 does not increase by more than 5 degrees Centigrade.

In order to facilitate fast heating of heating element 292 without using excessive energy, it is preferred to use a low mass heating element, such that the mass of heating element 292 within the air chamber 295 is less than one gram. Heating element 292 can have a flat paddle-like shape, as indicated schematically in FIG. 12, in order to improve its surface area contact with air to improve heat transfer.

Membrane 288 can have a characteristic time for a sufficient quantity of air to diffuse through the membrane to change the pressure in air chamber 295 by a predetermined amount. The characteristic time can depend on material properties, membrane thickness, pressure and temperature, for example. Thermally actuated degassing unit 290 can have a thermally-induced pressure build-up time to increase pressure in the air chamber 295 by the predetermined amount. The build-up time can depend upon the volume of the air chamber 295, the amount of pressure increase, the amount of energy dissipated in the heating element 292, and the heat transfer efficiency of the heating element 292. It is preferred that the characteristic time of the membrane 288 be significantly greater than the thermally-induced pressure build-up time, so that a substantial amount of air is not forced from the air chamber 295 through membrane 288 into ink passageways 270 as the pressure is building up before it reaches the cracking pressure of the check valve. (If the characteristic time of the membrane 288 is not significantly greater than the thermally-induced pressure build-up time, a second check valve can be used to isolate the air accumulation region near the membrane 288 from the air expulsion region, as described, for example in copending commonly assigned docket 95796, which is incorporated by reference herein in its entirety.) The characteristic time for air diffusion through the membrane is typically greater than five seconds and less than 500 seconds. By comparison, for a pressure change in the air chamber of 0.1 atmosphere, the thermally-induced pressure build-up time is typically greater than 0.5 second and less than 100 seconds.

Figure 13:
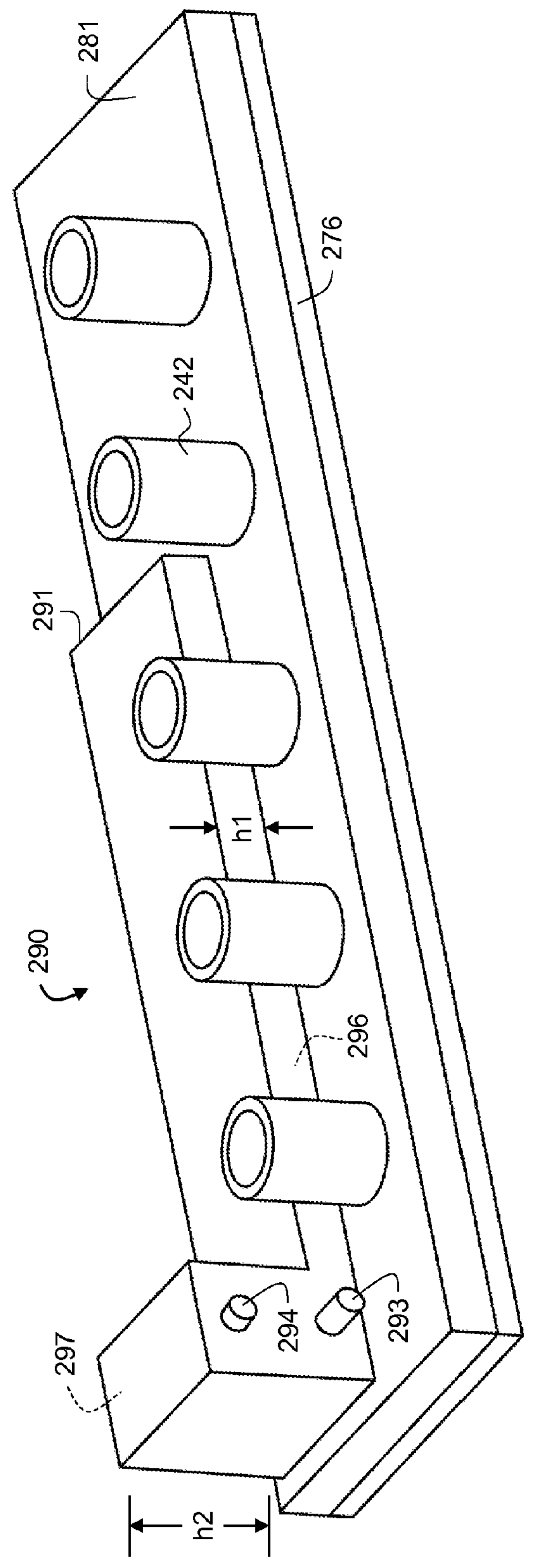
FIG. 13 shows the region seen in FIG. 11, but with a thermally actuated degassing unit attached, according to a second embodiment of the invention.
Figure 14:
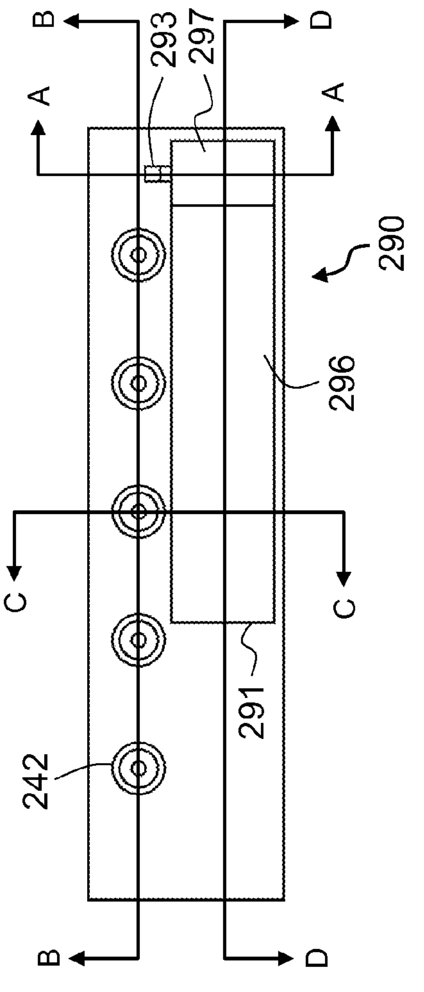
FIG. 14 shows a top view of the second embodiment.
Figure 15A:
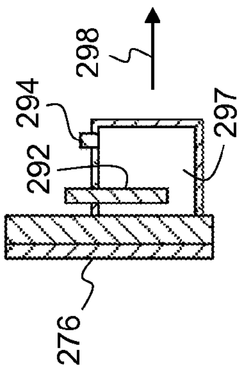
FIGS. 15A-D show several cross-sectional views of the second embodiment.
Figure 15B:
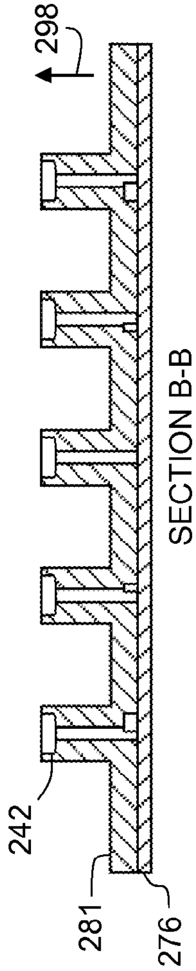
Figure 15C:
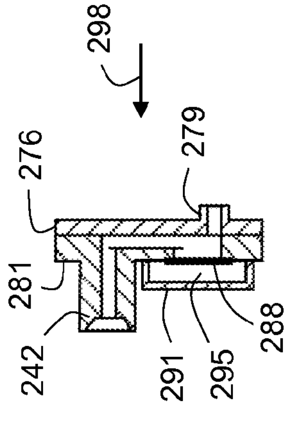
Figure 15D:
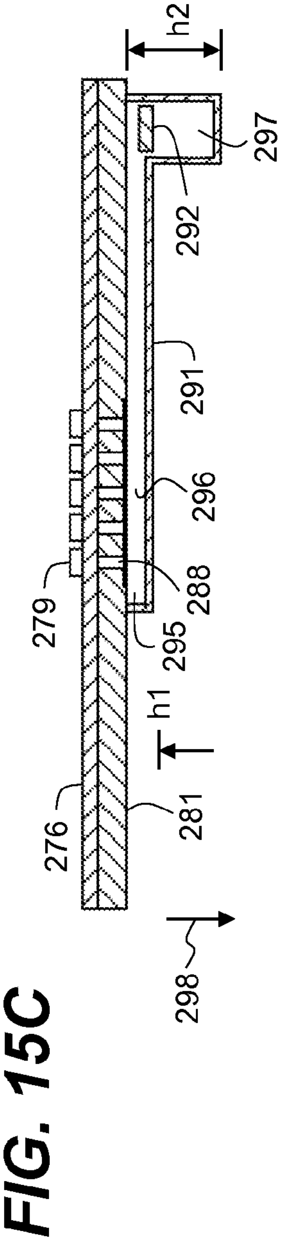
Figure 16:
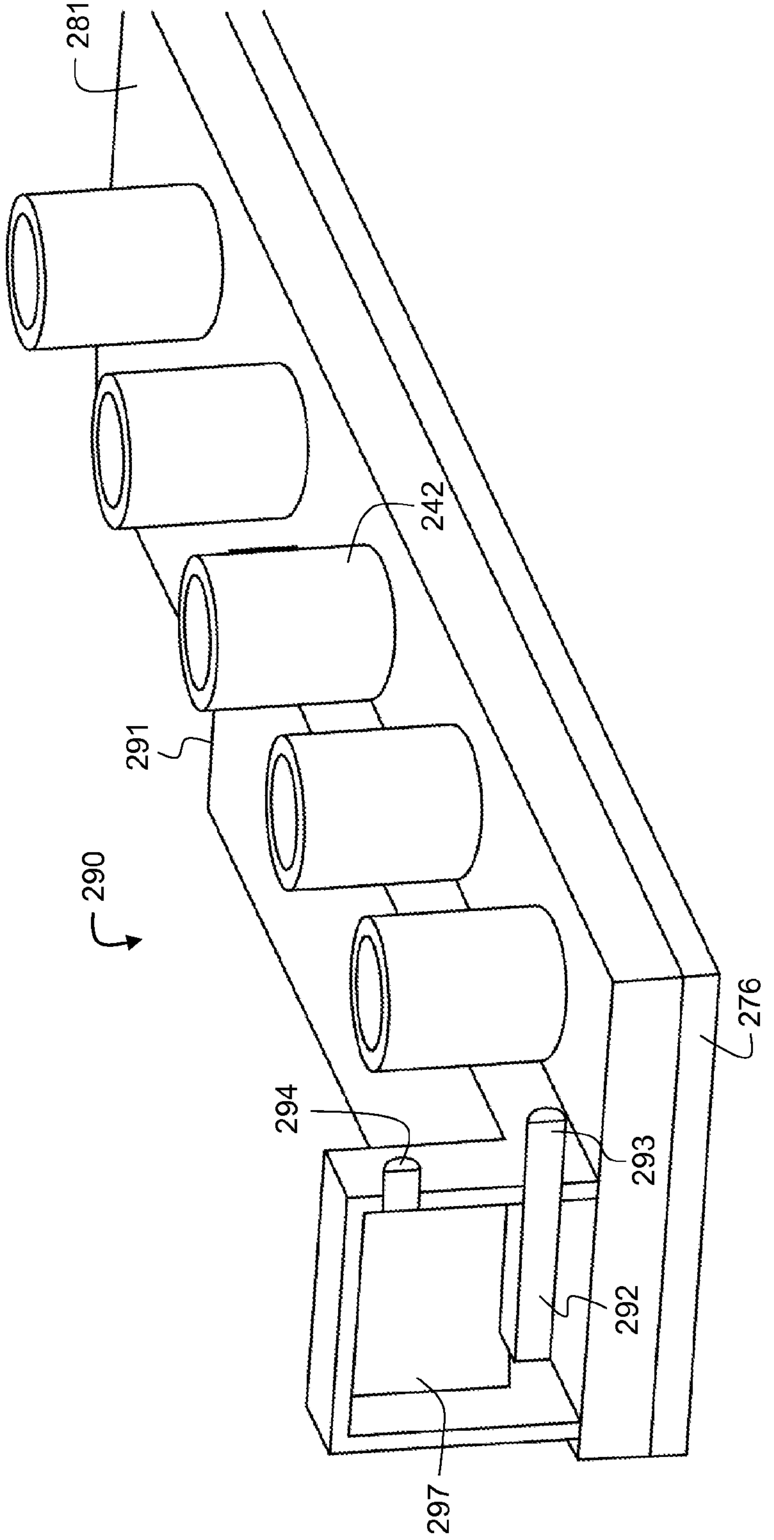
FIG. 16 shows a cutaway view of the thermally actuated degassing unit of the second embodiment.

In the first embodiment discussed above with reference to FIG. 12, the thermally-actuated degassing unit 290 was shown as having the heating element 292 located at one end of body 291, and the check valve 294 located at an opposite end. If the body 291 is long and narrow, as shown in FIG. 12, the average air temperature near heating element 292 can be substantially warmer than the average air temperature near check valve 294. A second embodiment, which can have improved performance, is shown in FIGS. 13-14 and FIGS. 15A-D (where FIG. 13 is a perspective view, FIG. 14 is a top view in the region of ink inlets 242, and FIGS. 15A-D are various cross-sections, as indicated). The cross-sectional views in FIGS. 15A-D are shown in different orientations, so for clarity in each of those figures an arrow 298 is shown indicating vertically up when the printhead is in its nominal operating orientation in the printer. In the second embodiment, the air chamber 295 within body 291 has a first portion 296 having a first height h1 above surface 281 and a second portion 297 having a second height h2 that is greater than h1. Heating element 292 and check valve 294 are located in or near the second portion 297 of the air chamber 295. When the printhead is in its operating orientation in the printer, check valve 294 can be located vertically above heating element 292. As the heated air rises from heating element 292 in second portion 297, the heat transfer efficiency from heating element 292 can improve, resulting in improved energy efficiency of the air chamber 295 and less pressure build-up time for air to leak back through membrane 288 to ink passageways 270. This design also helps facilitate cooling of the air chamber and heating element 292 when the power is turned off, since a greater proportion of the heated air is expelled through the check valve 294. In the example shown in FIGS. 15A-D, membrane 288 is located in the first portion 296 of the air chamber 295. FIG. 16 shows a cutaway perspective view showing second portion 297 of air chamber 295. Heating element 292 is also shown more clearly in this cutaway view. Although FIGS. 13-16 show the check valve 294 extending through the same wall of body 291 as electrical lead 293, optionally, check valve 294 can be located on the top wall of air chamber 297 (i.e. like a chimney on a roof).

Having described the thermally actuated degassing unit 290, we now describe some further details of the method of operation. Electrical power is applied to heat heating element 292 during a first time interval to increase the pressure in the air chamber 295 within body 291 above ambient pressure. When the cracking pressure of check valve 294 is reached, a quantity air is vented through check valve 294, after which the check valve closes again. Heating element 292 is allowed to cool during a second time interval to reduce the pressure in the air chamber 295 below ambient pressure, so that air is drawn from the ink passageway 270 through membrane 288 and into the air chamber 295, from which it can be subsequently expelled during a later heating and cooling cycle. Cooling of the heating element 292 can occur by not applying electrical power. In some embodiments the second time interval, during which degassing occurs, is longer than the first time interval, during which pressure build-up and air expulsion occurs.

In another embodiment, heating element 292 is a Peltier thermoelectric cooling device, such that voltage of one polarity causes the Peltier device to heat up (heating the air in the air chamber), and voltage of the opposite polarity causes the Peltier device to cool down (cooling the air in the air chamber). For embodiments including a thermoelectric cooling device rather than a simple resistive heating element 292, the thermoelectric cooling device would typically be mounted on an internal wall of the body 291 of the thermally actuated degassing device 290, and a cooling plate would be mounted externally on the same wall of the body.

In some embodiments, the power to the heating element 292 is on whenever power is applied to the printhead for printing. In such embodiments, pressure build-up occurs during printing, and degassing occurs when the printer is not printing. In other embodiments, power to the heating element 292 is turned off during printing of an image, and is turned on to initiate a degassing cycle when printing is not occurring. Such an embodiment can be appropriate if waste heat from the air chamber results in excessive heating of the ink and printhead.

In still other embodiments, controller 14 (FIG. 1) controls a power supply to provide heat for the heating element 294 at particular instances for a predetermined duration known to raise the temperature and pressure sufficiently to cause air expulsion through the check valve 294. Controller 14 can include instructions for controlling the power source. Controller 14 can send signals to the power supply according to instructions to begin the first time interval for heating the heating element 292. These instructions can be event-based, clock-based, count-based, sensor-based or a combination of these. Examples of an event-based instruction would be for controller 14 to send appropriate signals to apply power to the heating element when the printer is turned on, or just before or after a maintenance operation (such as wiping) is performed, or after the last page of a print job is printed. An example of a clock-based instruction would be for the controller to send appropriate signals to apply power to the heating element one hour after the last time the heating element 292 was heated. Examples of a count-based instruction would be for controller 14 to send appropriate signals to apply power to the heating element after a predetermined number of pages were printed, or after a predetermined number of maintenance cycles were performed. Examples of a sensor-based instruction would be for controller 14 to send appropriate signals to apply power to the heating element when an optical sensor detects that one or more jets are malfunctioning, or when a thermal sensor indicates that the printhead has exceeded a predetermined temperature. An example of a combination-based instruction would be for controller to send appropriate signals to apply power to the heating element when a thermal sensor and a clock indicate that the printhead has been above a predetermined temperature for longer than a predetermined length of time.

When ink is raised to an elevated temperature, air that is dissolved in the ink tends to come out of solution more readily. In a thermal inkjet printhead it is possible to heat the heaters in the drop ejectors insufficiently to eject drops of ink, but sufficiently to raise the temperature of the ink somewhat to assist in the removal of air in the ink passageways.

Because embodiments of this invention extract air without extracting ink, less ink is wasted than in conventional printers. The waste ink pad used in conventional printers can be eliminated, or at least reduced in size to accommodate maintenance operations such as spitting from the jets. This allows the printer to be more economical to operate, more environmentally friendly and more compact. Furthermore, since the air extraction method of the present invention can be done at any time, with the reduced pressure from the thermally actuated degassing unit applied to the printhead over a continuous time interval, it is not necessary to delay printing operations to extract air from the printhead. The operation of the thermally actuated degassing unit is also very quiet, which is desirable.

The invention has been described in detail with particular reference to certain preferred embodiments thereof, but it will be understood that variations and modifications can be effected within the spirit and scope of the invention.

PARTS LIST

10 Inkjet printer system
12 Image data source
14 Controller
15 Image processing unit
16 Electrical pulse source
18 First fluid source
19 Second fluid source
20 Recording medium
100 Inkjet printhead
110 Inkjet printhead die
111 Substrate
120 First nozzle array
121 Nozzle(s)
122 Ink delivery pathway (for first nozzle array)
130 Second nozzle array
131 Nozzle(s)
132 Ink delivery pathway (for second nozzle array)
181 Droplet(s) (ejected from first nozzle array)
182 Droplet(s) (ejected from second nozzle array)
200 Carriage
240 Standpipe
241 Holder (for mounting multi-chamber ink tank)
242 Inlet port
245 End
246 Holder (for mounting single chamber ink tank)
247 Gasket
249 Wall
250 Printhead
251 Printhead die
253 Nozzle array
254 Nozzle array direction
256 Encapsulant
257 Flex circuit
258 Connector board
262 Multi-chamber ink tank
264 Single-chamber ink tank
265 Manifold
270 Ink passageway
271 First end
272 Groove
273 Second end
274 Hole
275 Surface (of printhead)
276 Cover
277 Sealing face
278 Outlet holes
279 Outlet pipes
280 Opening
281 Surface
282 Recess
283 Face
284 Section
285 Wall
286 First side (of membrane)
288 Membrane
290 Degassing unit
291 Body
292 Heating element
293 Lead
294 Check valve
295 Air chamber
296 First portion (of air chamber)
297 Second portion (of air chamber)
300 Printer chassis
302 Paper load entry direction
303 Print region
304 Media advance direction
305 Carriage scan direction
306 Right side of printer chassis
307 Left side of printer chassis
308 Front of printer chassis
309 Rear of printer chassis
310 Hole (for paper advance motor drive gear)
311 Feed roller gear
312 Feed roller
313 Forward rotation direction (of feed roller)
320 Pick-up roller
322 Turn roller
323 Idler roller
324 Discharge roller
325 Star wheel(s)
330 Maintenance station
370 Stack of media
371 Top piece of medium
380 Carriage motor
382 Carriage guide rail
383 Encoder fence
384 Belt
390 Printer electronics board
392 Cable connectors

The invention claimed is:

1. An inkjet printhead comprising:
a drop ejector array;
an ink passageway for providing ink to the drop ejector array; and
a thermally actuated degassing unit including:
a body enclosing an air chamber;
a check valve configured to allow air to vent from the air chamber to ambient when the pressure in the air chamber exceeds ambient air pressure by a predetermined pressure;
a heating element inside the air chamber; and
a membrane including a first side and a second side opposite the first side, wherein the first side faces the air chamber and the second side faces the ink passageway.

2. The inkjet printhead of claim 1 further comprising a holder for a detachable ink tank, the holder including:
an ink port for receiving ink from the detachable ink tank; and a surface including an opening connected to the ink passageway, wherein the membrane is adhered to the surface and wherein the membrane covers the opening.

3. The inkjet printhead of claim 2 wherein the surface further includes a recess to accommodate the membrane.

4. The inkjet printhead of claim 2, wherein the ink passageway is a first ink passageway and the opening is a first opening, the inkjet printhead further comprising a second ink passageway and the holder further comprising a second opening connected to the second ink passageway, wherein the membrane covers both the first opening and the second opening.

5. The inkjet printhead of claim 4 further comprising an ink manifold including:

a plurality of inlets disposed at a first spacing from each other for connecting to a corresponding plurality of ink ports and a plurality of outlets disposed at a second spacing for connecting to a corresponding plurality of drop ejector arrays, wherein the second spacing is less than the first spacing.

6. The inkjet printhead of claim 2 further comprising a detachable ink tank mounted in the holder, wherein the thermally actuated degassing unit is disposed between the drop ejector array and the ink tank.

7. The inkjet printhead of claim 1 wherein a thickness of the membrane is between 25 microns and 300 microns.

8. The inkjet printhead of claim 1, the membrane including a characteristic time for a sufficient quantity of air to diffuse through the membrane to change the pressure in the air chamber by a predetermined amount, and the thermal degassing unit including a thermally-induced pressure build-up time to increase the pressure in the air chamber by the predetermined amount, wherein the characteristic time is greater than the thermally-induced pressure build-up time.

9. The inkjet printhead of claim 8, wherein the check valve includes a cracking pressure that is greater than 1.1 atmospheres.

10. The inkjet printhead of claim 8, wherein for a pressure change in the air chamber of 0.1 atmospheres, the characteristic time for air diffusion through the membrane is greater than five seconds and less than 500 seconds.

11. The inkjet printhead of claim 8, wherein for a pressure change in the air chamber of 0.1 atmospheres, the thermally-induced pressure build-up time is greater than 0.5 second and less than 100 seconds.

12. The inkjet printhead of claim 1, the body including a first end and a second end opposite the first end, wherein the heating element is disposed proximate the first end and the check valve is disposed proximate the second end.

13. The inkjet printhead of claim 1, the air chamber including a first portion having a first height and a second height that is greater than the first height, wherein the heating element and the check valve are proximate the second portion of the air chamber.

14. The inkjet printhead of claim 13, wherein the membrane is disposed proximate the first portion of the air chamber.

15. The inkjet printhead of claim 1, wherein the heating element comprises a thermoelectric cooling device.

16. An inkjet printer comprising:

a drop ejector array;

an ink passageway for providing ink to the drop ejector array;

a thermally actuated degassing unit including:

a body enclosing an air chamber;

a check valve configured to allow air to vent from the air chamber to ambient when the pressure in the air chamber exceeds ambient air pressure by a predetermined pressure;

a heating element inside the air chamber; and a membrane including a first side and a second side opposite the first side, wherein the first side faces the air chamber and the second side faces the ink passageway; and a controller for controlling operations of the inkjet printer.

17. The inkjet printer of claim 16 further comprising an inkjet printhead including:

the drop ejector array;

the ink passageway; and the thermally actuated degassing unit.

18. The inkjet printer of claim 16 further comprising a carriage for moving the drop ejector array during printing of an image, wherein the thermally actuated degassing unit is configured to be moved by the carriage.

19. The inkjet printer of claim 16, wherein the check valve includes a cracking pressure that is greater than 1.1 atmospheres.

20. The inkjet printer of claim 16, wherein the heating element is suspended within the air chamber such that the heating element does not touch the body of the air chamber.

21. The inkjet printer of claim 16, wherein the mass of the heating element inside the air chamber is less than one gram.

22. The inkjet printer of claim 16, wherein the membrane is in contact with ink in the ink passageway.

23. The inkjet printer of claim 16, the air chamber including a first portion having a first height and a second portion having a second height that is greater than the first height, wherein the heating element and the check valve are proximate the second portion of the air chamber.

24. The inkjet printer of claim 23, wherein the membrane is disposed proximate the first portion of the air chamber.

25. The inkjet printer of claim 16, wherein the heating element comprises a thermoelectric cooling device.

* * * * *